US007933072B2

(12) United States Patent
Suzuki

(10) Patent No.: US 7,933,072 B2
(45) Date of Patent: Apr. 26, 2011

(54) ZOOM LENS AND IMAGING APPARATUS

(75) Inventor: Takashi Suzuki, Saitama (JP)

(73) Assignee: Fujinon Corporation, Saitama-shi (JP)

( * ) Notice: Subject to any disclaimer, the term of this patent is extended or adjusted under 35 U.S.C. 154(b) by 41 days.

(21) Appl. No.: 12/562,909

(22) Filed: Sep. 18, 2009

(65) Prior Publication Data
US 2010/0073776 A1 Mar. 25, 2010

(30) Foreign Application Priority Data

Sep. 19, 2008 (JP) ................ P2008-241398

(51) Int. Cl.
G02B 15/14 (2006.01)
(52) U.S. Cl. ........................ 359/686; 359/684
(58) Field of Classification Search .................. 359/676, 359/683, 684, 686
See application file for complete search history.

(56) References Cited

U.S. PATENT DOCUMENTS

| 6,671,104 B2 | 12/2003 | Endo | |
| 7,085,072 B2 * | 8/2006 | Kuba | 359/689 |
| 7,529,034 B2 * | 5/2009 | Kawakami et al. | 359/680 |
| 2003/0234985 A1 | 12/2003 | Sato | |
| 2004/0051958 A1 | 3/2004 | Yoneyama | |
| 2006/0066953 A1 * | 3/2006 | Nishio et al. | 359/676 |
| 2007/0127124 A1 | 6/2007 | Iwasawa | |
| 2007/0242366 A1 * | 10/2007 | Saito | 359/680 |
| 2008/0144189 A1 | 6/2008 | Iwasawa et al. | |

FOREIGN PATENT DOCUMENTS

| JP | 3081698 B2 | 6/2000 |
| JP | 2004-85600 A | 3/2004 |
| JP | 3590807 B2 | 9/2004 |
| JP | 2007-156239 A | 6/2007 |

* cited by examiner

Primary Examiner — Scott J Sugarman
(74) Attorney, Agent, or Firm — Birch, Stewart, Kolasch & Birch, LLP

(57) ABSTRACT

A zoom lens includes a first negative lens group, a second negative lens group, a third positive lens group, an aperture diaphragm, and a fourth positive lens group arranged in this order from an object side. When power varies from a wide angle end to a telephoto end, the first and second lens groups are moved to an image surface along an optical axis and then moved to the object side. The third and fourth lens groups are moved to only the object side along the optical axis. The first lens group includes at least one aspheric lens, and the aspheric lens has an aspheric shape in which a positive refractive power is increased toward the periphery of the lens when a paraxial refractive power is positive and a negative refractive power is decreased toward the periphery of the lens when the paraxial refractive power is negative.

10 Claims, 5 Drawing Sheets

EXAMPLE 1

EXAMPLE 1

EXAMPLE 2

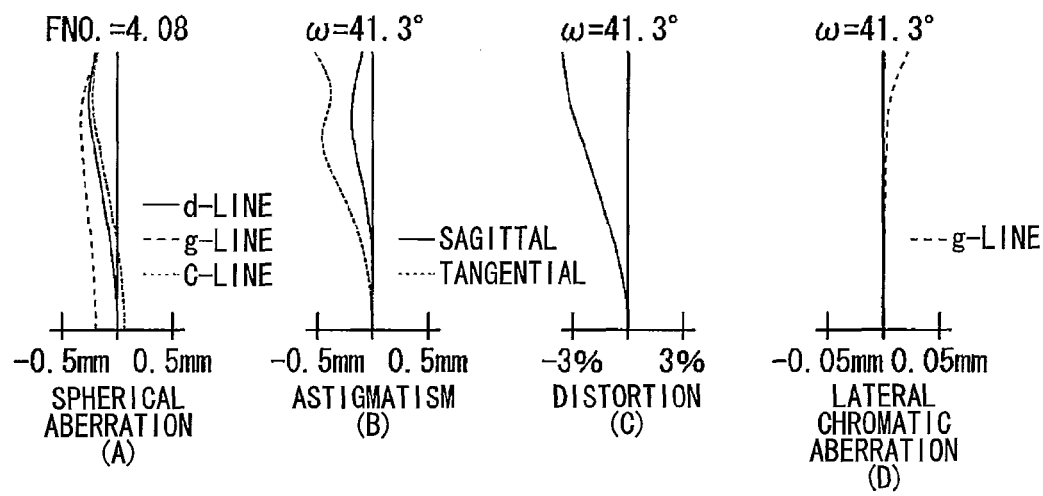
FIG.3 EXAMPLE 1, WIDE ANGLE END
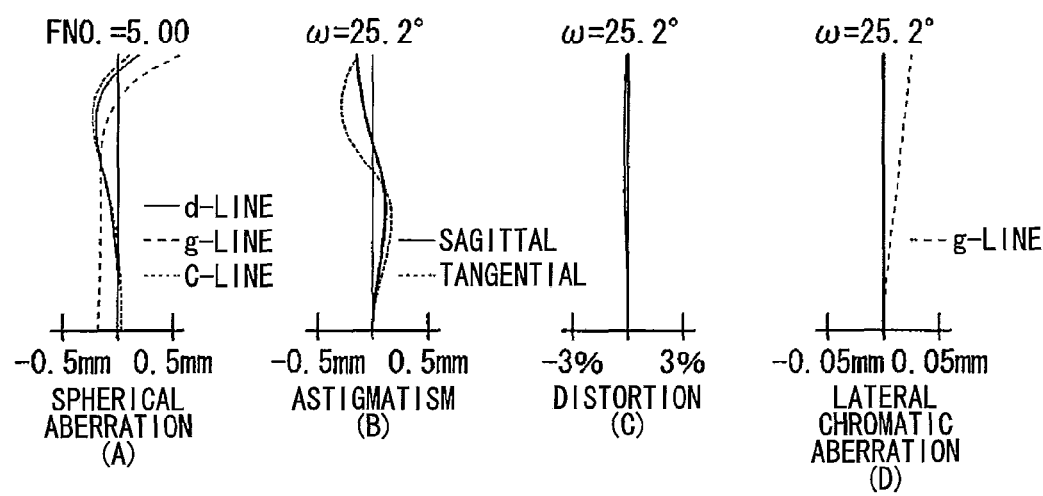
FIG.4 EXAMPLE 1, MIDDLE
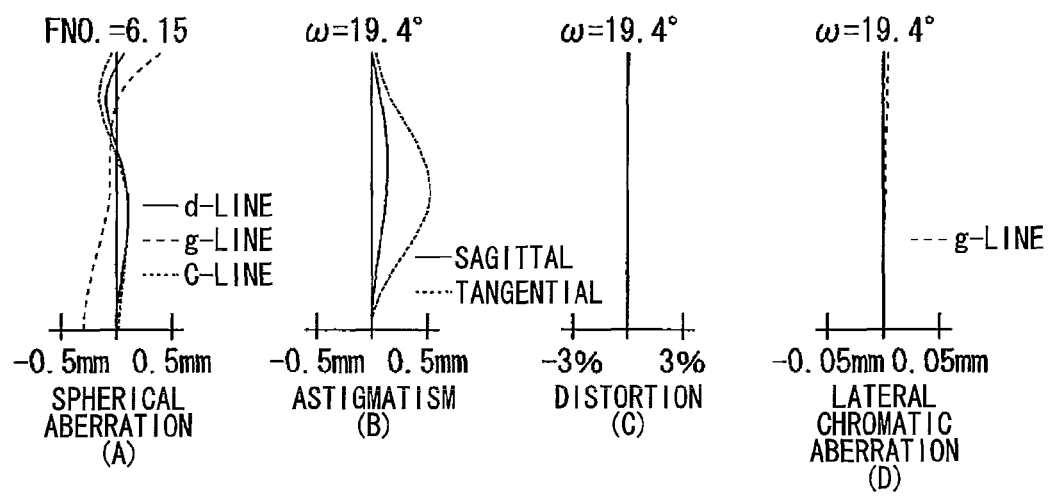
FIG.5 EXAMPLE 1, TELEPHOTO END

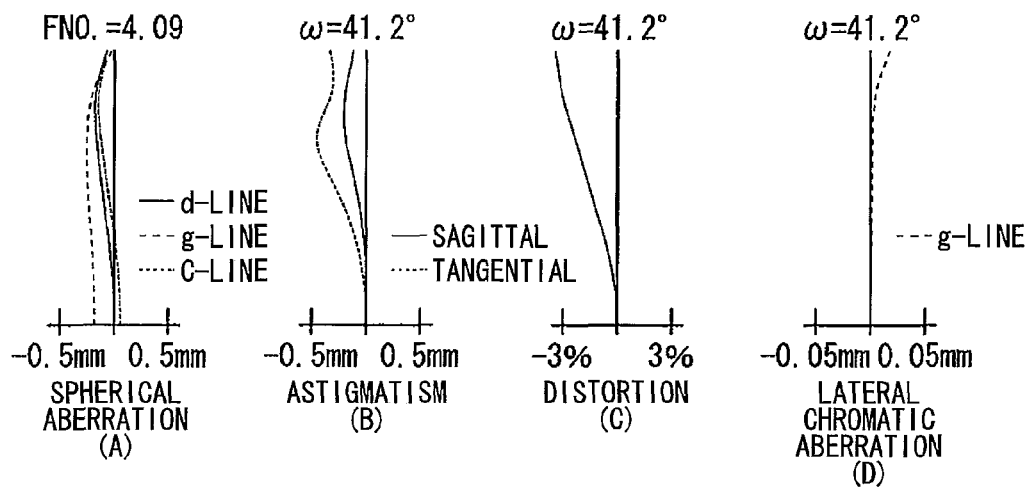
FIG.6 EXAMPLE 2, WIDE ANGLE END
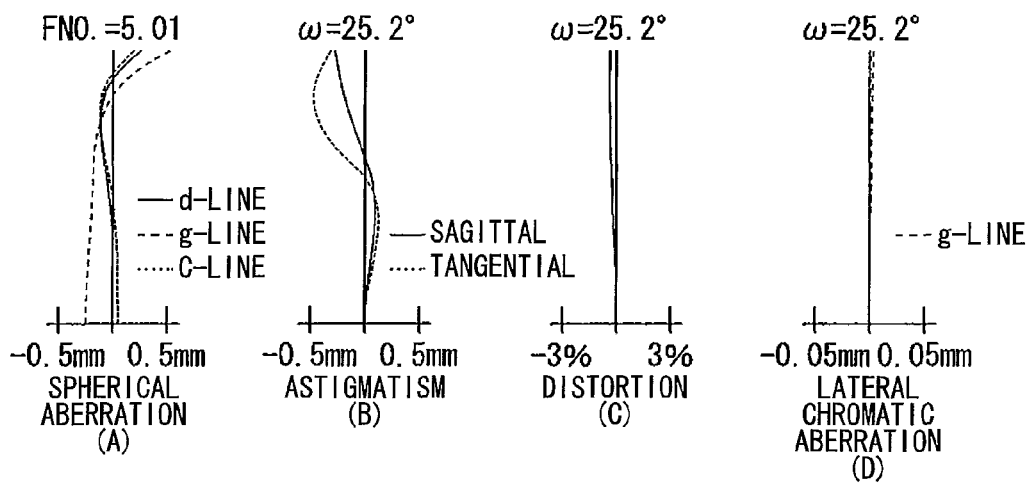
FIG.7 EXAMPLE 2, MIDDLE
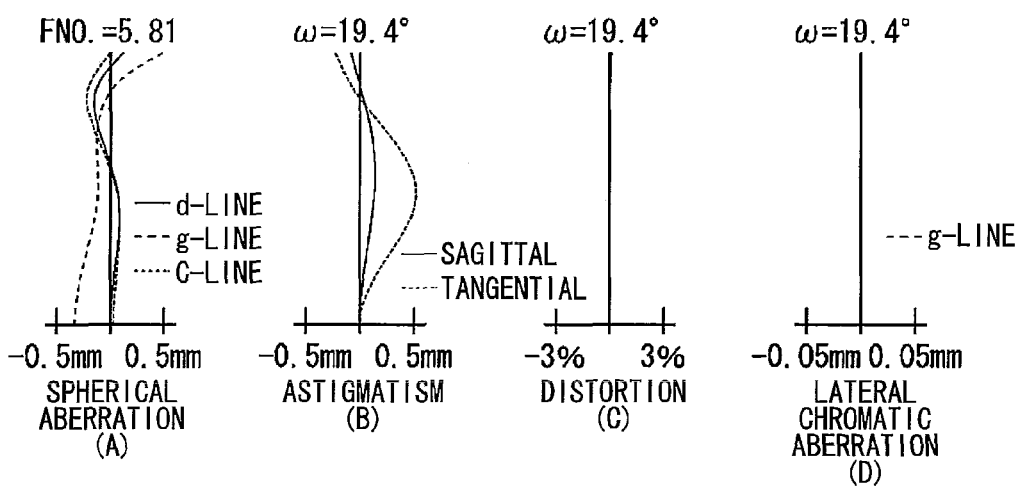
FIG.8 EXAMPLE 2, TELEPHOTO END

ZOOM LENS AND IMAGING APPARATUS

CROSS-REFERENCE TO RELATED APPLICATIONS

This application is based upon and claims the benefit of priority from the Japanese Patent Application No. 2008-241398 filed on Sep. 19, 2008; the entire contents of which are incorporated herein by reference.

BACKGROUND OF THE INVENTION

1. Field of the Invention

The present invention relates to a wide-angle zoom lens applicable for, for example, a silver salt single lens reflex camera or a digital single lens reflex camera, and more particularly, to a zoom lens having an angle of view 2ω of more than 70° at a wide angle end, an F number of about F4 to about F5.6, and a zoom ratio of about 2.4, and an imaging apparatus including the zoom lens.

2. Description of the Related Art

In general, a wide-angle zoom lens for a single reflex lens requires a large back focal length. Therefore, an optical system is configured such that there is strong asymmetry in an optical axis direction. In this structure, lateral chromatic aberration and distortion are increased. In the related art, an aspheric surface is generally used to maintain the performance. As the zoom lens having the above-mentioned structure, Japanese Patent No. 3590807, Japanese Patent No. 3081698, and JP-A-2004-85600 disclose a three-group zoom lens including three lens groups having negative, positive, and positive refractive powers arranged in this order from an object side. In addition, JP-A-2007-156239 discloses a four-group zoom lens including four lens groups having negative, negative, positive, and positive refractive powers arranged in this order from the object side. In the zoom lens disclosed in JP-A-2007-156239, the second lens group is moved in a direction orthogonal to the optical axis in order to correct camera shake.

In general, it is preferable that the performance of a zoom lens be little changed when power varies. In addition, it is preferable that a focus group have a light weight and high operability. In the three-group zoom lens, the entire first lens group is moved for focusing. However, in the three-group zoom lens, since the first lens group has a large outside diameter and a heavy weight, the operability is lowered during focusing. Therefore, for example, as in the zoom lens disclosed in Japanese Patent No. 3590807, an inner focus system has been proposed in which a positive second lens group is moved toward an image surface during focusing on a short-distance object point. In this case, it is considered to increase the number of lens groups divided, in order to improve a zoom performance and a focus performance. JP-A-2007-156239 discloses a zoom lens that includes four lens groups in order to correct camera shake, not in order to improve the zoom performance and the focus performance.

SUMMARY OF THE INVENTION

The invention has been made in order to solve the above-mentioned problems, and an object of the invention is to provide a zoom lens capable of achieving an optical system having a small size, a zoom ratio of 2 or more at a wide angle, and a small variation in performance when power varies, and an imaging apparatus. Another object of the invention is to provide a zoom lens having high focus performances, such as a light-weight focus group and a small variation in performance during focusing, in addition to a high zoom performance, and an imaging apparatus.

According to an aspect of the invention, a zoom lens includes a first lens group having a negative refractive power, a second lens group having a negative refractive power, a third lens group having a positive refractive power, a stop, and a fourth lens group having a positive refractive power arranged in this order from an object side. When power varies from a wide angle end to a telephoto end, the first lens group and the second lens group are moved to an image surface along an optical axis and then moved to the object side. The third lens group and the fourth lens group are moved to only the object side along the optical axis. The first lens group includes at least one aspheric lens. The aspheric lens has an aspheric shape in which a positive refractive power is increased toward the periphery of the lens when a paraxial refractive power is positive and a negative refractive power is decreased toward the periphery of the lens when the paraxial refractive power is negative.

The zoom lens according to the above-mentioned aspect of the invention has a four-lens structure in which four lens groups having negative, negative, positive, and positive refractive powers are arranged in this order from the object side. In the four-lens structure, a movement method is optimized such that, when power varies from the wide angle end to the telephoto end, the first lens group and the second lens group are moved to an image surface along the optical axis and then moved to the object side and the third lens group and the fourth lens group are moved to only the object side along the optical axis. In addition, the first lens group includes at least one aspheric lens, and the aspheric shape is optimized. In this way, it is possible to achieve an optical system having a small size, a zoom ratio of 2 or more at a wide angle, and a small variation in performance when power varies.

In addition, the following preferred structure is appropriately used to improve the zoom performance or the focus performance.

In the zoom lens according to the above-mentioned aspect, focusing on a short-distance object point may be performed by moving the second lens group to the object side. The second lens group may include one negative lens having a concave surface facing the object side. The negative lens in the second lens group may have a shape in which the absolute value of the radius of curvature of an object-side surface is smaller than that of an image-side surface.

In this way, it is possible to reduce the weight of a focus group and a variation in performance during focusing.

In the zoom lens according to the above-mentioned aspect, the third lens group may include a plurality of positive lenses and one or more negative lenses, and the fourth lens group may include a plurality of positive lenses and one or more negative lenses.

The third and fourth lens groups may satisfy the following Conditional expression 1:

$0.7 < \Delta Z3/\Delta Z4 < 1.1$ [Conditional expression 1]

(where $\Delta Z3$ indicates the movement amount of the third lens group when power varies from the wide angle end to the telephoto end, and $\Delta Z4$ indicates the movement amount of the fourth lens group when power varies from the wide angle end to the telephoto end).

The first lens group may include at least one positive lens satisfying the following Conditional expressions 2 and 3:

$N1 > 1.75$, and [Conditional expression 2]

$v1 > 28$ [Conditional expression 3]

(where N1 indicates the refractive index of a positive lens having the highest refractive index in the first lens group with respect to the d-line, and ν1 indicates the Abbe number of the positive lens having the highest refractive index in the first lens group with respect to the d-line).

The first lens group may include a plurality of negative lenses and one positive lens. In addition, the positive lens having the highest refractive index in the first lens group may be a biconvex lens.

The fourth lens group may include at least one positive lens satisfying the following Conditional expression 4:

ν2>75         [Conditional expression 4]

(where ν2 indicates the Abbe number of a positive lens in the fourth lens group with respect to the d-line).

In the zoom lens according to the above-mentioned aspect, the first lens group and the second lens group may be integrally moved when power varies.

According to another aspect of the invention, an imaging apparatus includes the zoom lens according to the above-mentioned aspect of the invention; and an imaging device that outputs an image signal corresponding to an optical image formed by the zoom lens.

The imaging apparatus according to the above-mentioned aspect uses a high-performance zoom lens according to the above-mentioned aspect of the invention having a high zoom performance or a high focus performance as an imaging lens. Therefore, the imaging apparatus captures an image with a high zoom performance or a high focus performance.

The zoom lens according to the above-mentioned aspect of the invention has a four-group structure in which four lens groups having negative, negative, positive, and positive refractive powers are arranged in this order from the object side. In addition, the first lens group includes an appropriate aspheric surface, and a movement method when power varies is optimized. In this way, it is possible to achieve an optical system having a small size, a zoom ratio of 2 or more at a wide angle, and a small variation in performance when power varies.

Focusing on a short-distance object point is performed by moving the second lens group to the object side, and the second lens group has one negative lens having a concave surface facing the object side. Therefore, it is possible to achieve an optical system having high focus performances, such as a light-weight focus group and a small variation in performance during focusing, in addition to the zoom performance.

The imaging apparatus according to the above-mentioned aspect of the invention uses a high-performance zoom lens according to the above-mentioned aspect of the invention having a high zoom performance or a high focus performance as an imaging lens. Therefore, the imaging apparatus can capture an image with a high zoom performance or a high focus performance.

BRIEF DESCRIPTION OF THE DRAWINGS

FIG. 3 is a diagram illustrating the aberrations of the zoom lens according to Example 1 at a wide angle end, in which (A) shows spherical aberration, (B) shows astigmatism, (C) shows distortion, and (D) shows lateral chromatic aberration;

FIG. 4 is a diagram illustrating the aberrations of the zoom lens according to Example 1 in a middle portion, in which (A) shows spherical aberration, (B) shows astigmatism, (C) shows distortion, and (D) shows lateral chromatic aberration;

FIG. 5 is a diagram illustrating the aberrations of the zoom lens according to Example 1 at a telephoto end, in which (A) shows spherical aberration, (B) shows astigmatism, (C) shows distortion, and (D) shows lateral chromatic aberration;

FIG. 6 is a diagram illustrating the aberrations of the zoom lens according to Example 2 at the wide angle end, in which (A) shows spherical aberration, (B) shows astigmatism, (C) shows distortion, and (D) shows lateral chromatic aberration;

FIG. 7 is a diagram illustrating the aberrations of the zoom lens according to Example 2 in the middle portion, in which (A) shows spherical aberration, (B) shows astigmatism, (C) shows distortion, and (D) shows lateral chromatic aberration;

FIG. 8 is a diagram illustrating the aberrations of the zoom lens according to Example 2 at the telephoto end, in which (A) shows spherical aberration, (B) shows astigmatism, (C) shows distortion, and (D) shows lateral chromatic aberration.

DESCRIPTION OF THE PREFERRED EMBODIMENTS

Hereinafter, exemplary embodiments of the invention will be described in detail with reference to the accompanying drawings.

Figure 1:
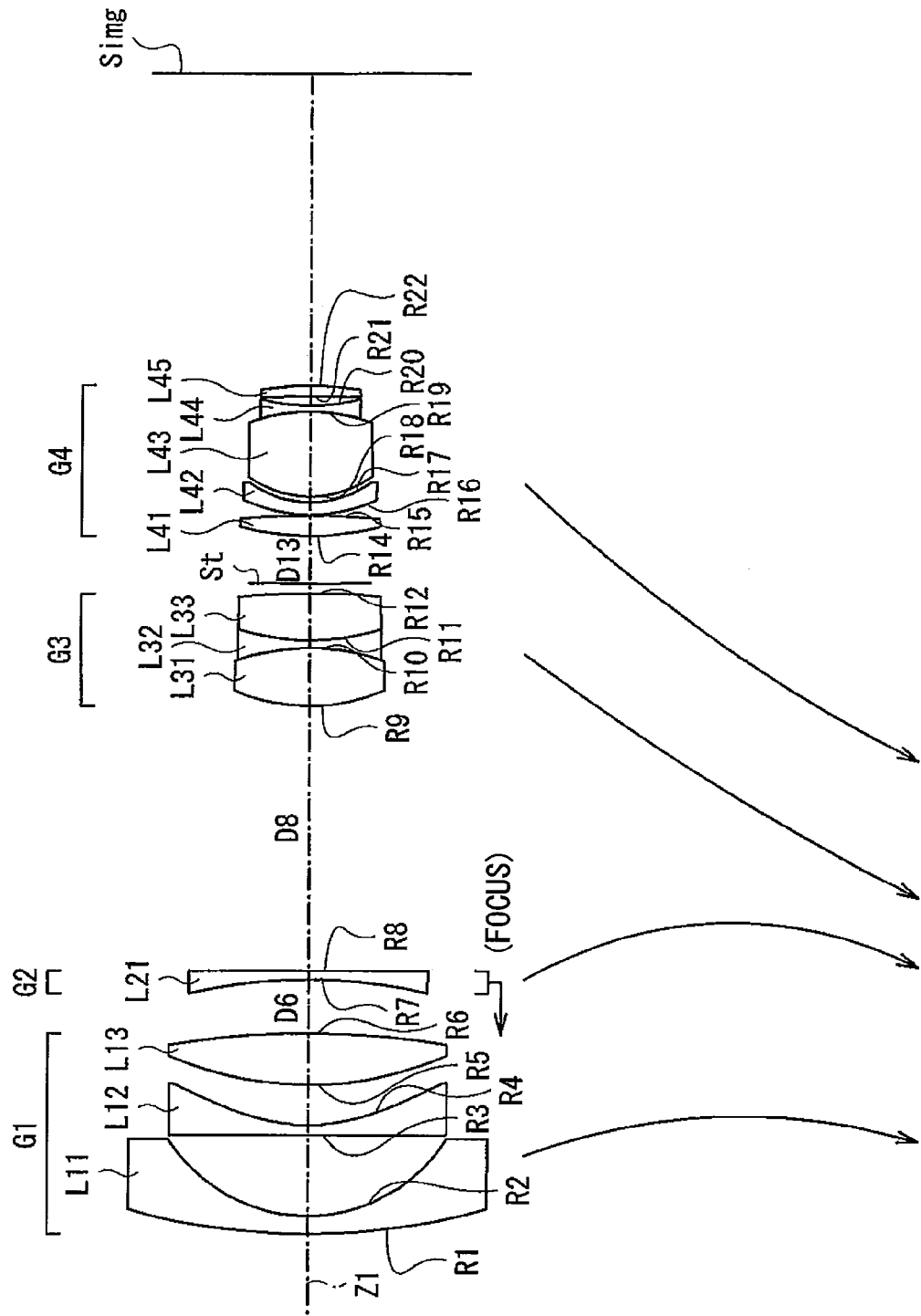
FIG. 1 is a diagram illustrating a first structural example of a zoom lens according to an embodiment of the invention, and is a lens cross-sectional view corresponding to Example 1.
Figure 2:
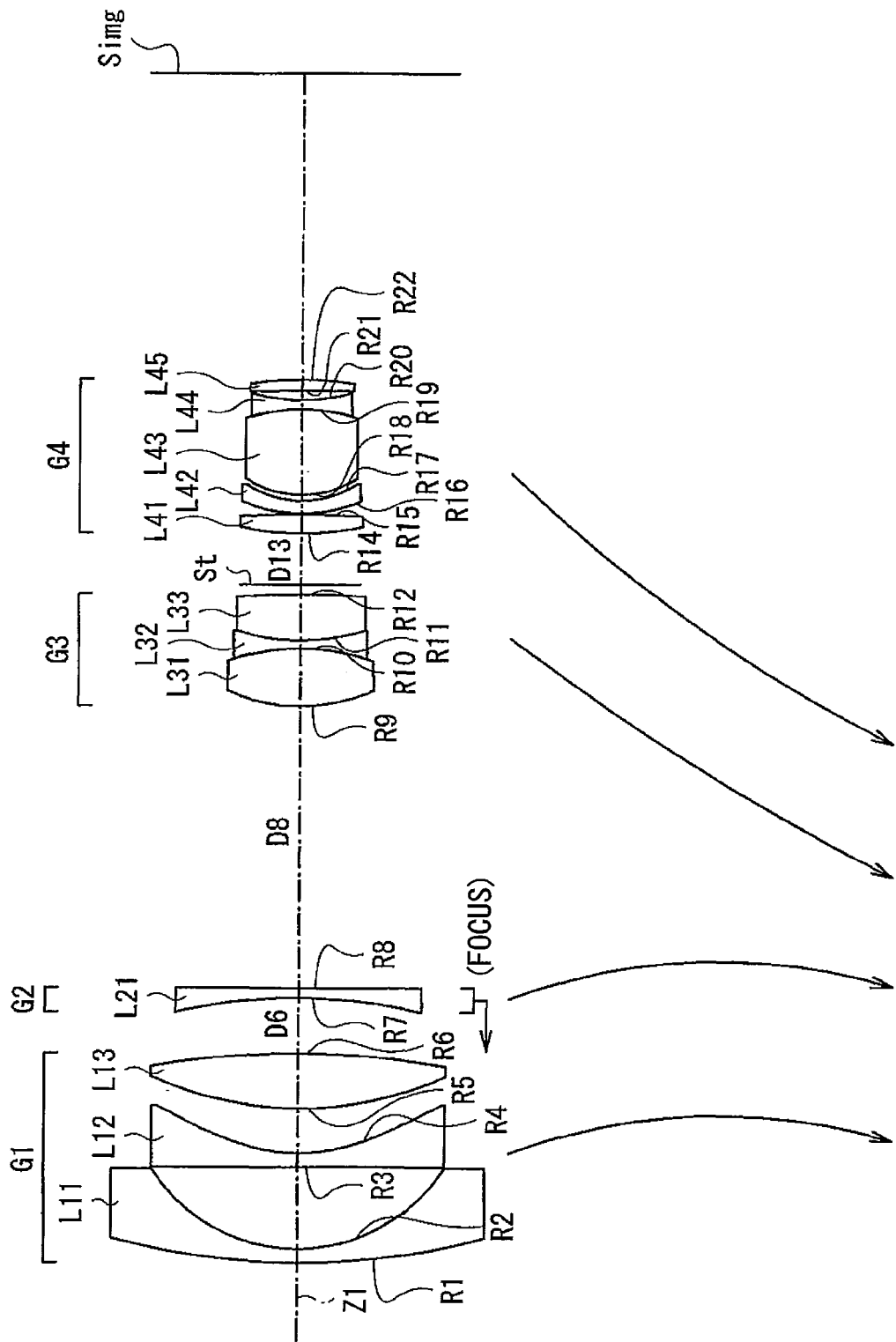
FIG. 2 is a diagram illustrating a second structural example of the zoom lens according to the embodiment of the invention, and is a lens cross-sectional view corresponding to Example 2.

FIG. 1 is a diagram illustrating a first structural example of a zoom lens according to an embodiment of the invention. The structural example corresponds to the structure of a lens according to a first numerical example (Table 1 and Tables 2A and 2B), which will be described below. FIG. 1 corresponds to the arrangement of an optical system in an infinity focusing state (shortest focal length) at a wide angle end. Similarly, FIG. 2 is a cross-sectional view illustrating a second structural example corresponding to the structure of a lens according to a second numerical example, which will be described below. In FIGS. 1 and 2, Ri indicates the radius of curvature of an i-th surface. In this case, the surface of a component closest to an object side is given number 1, and the surface number is sequentially increased toward an image side (imaging side). Di indicates the surface spacing between an i-th surface and an (i+1)-th surface on an optical axis Z1. For the surface spacing Di, surface spacings D6, D8, and D13 are only given between the portions that are moved when power varies or during focusing. The following structural examples have the same basic structure. Therefore, the first structural example shown in FIG. 1 will be described below as the basic structure.

The zoom lens includes a first lens group G1 having a negative refractive power, a second lens group G2 having a negative refractive power, a third lens group G3 having a positive refractive power, and a fourth lens group G4 having a positive refractive power arranged in this order from an object side along the optical axis Z1. An optical aperture diaphragm St is provided between the third lens group G3 and the fourth lens group G4.

The zoom lens can be provided in, for example, a digital single lens reflex camera. A member corresponding to the structure of an imaging unit provided in a camera is arranged on the image side of the zoom lens. For example, an imaging device, such as a CCD (charge coupled device) or a CMOS (complementary metal oxide semiconductor), is provided on an image forming surface (imaging surface) Simg of the zoom lens. The imaging device outputs an image signal corresponding to an optical image formed by the zoom lens. At least the zoom lens and the imaging device form an imaging apparatus according to this embodiment. Although not shown in the drawings, various optical members may be provided between the last lens group (the fourth lens group G4) and the imaging device according to the structure of a camera having the lens provided therein. For example, a plane-shaped optical member, such as a cover glass for protecting the image surface or an infrared cut filter, may be provided.

Figure 9:
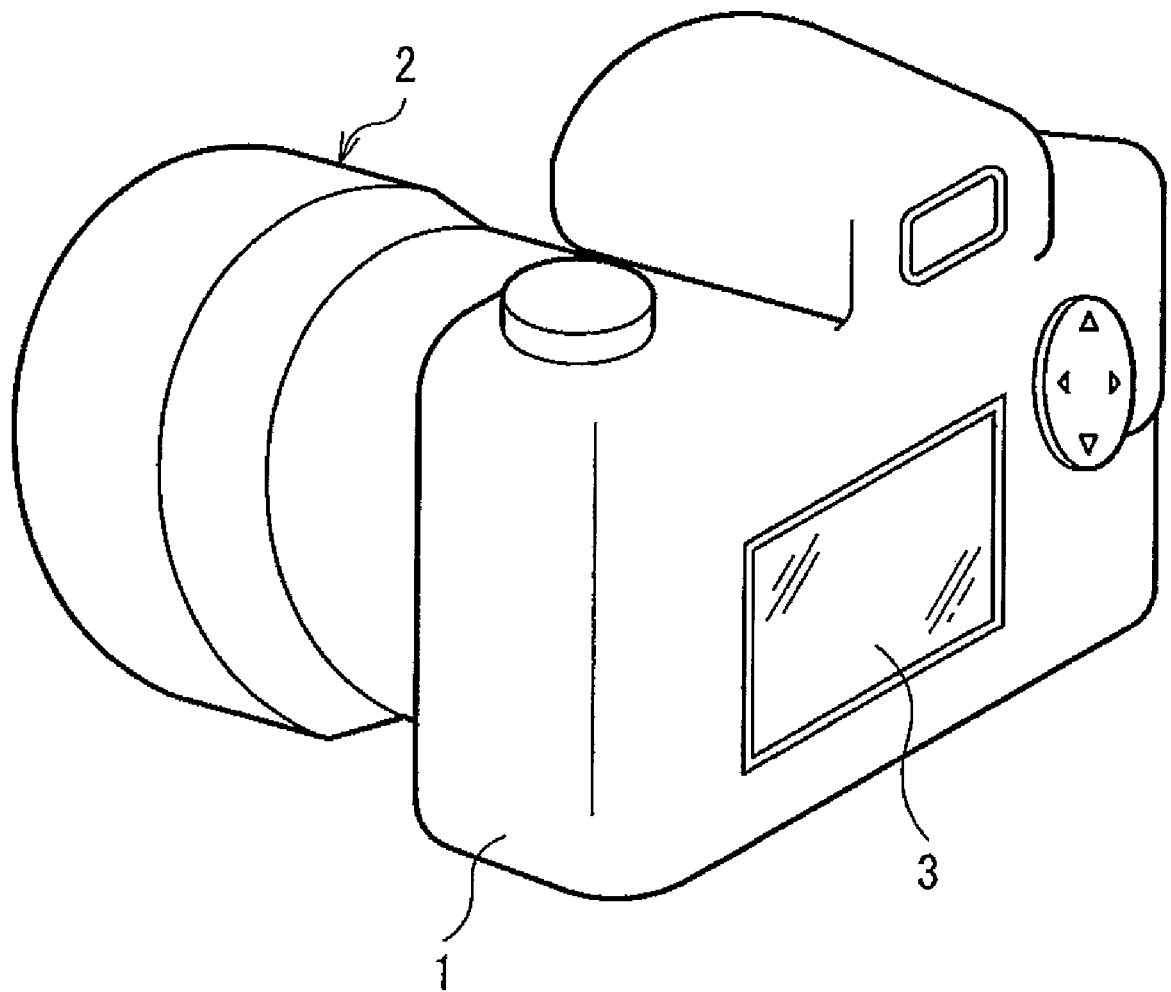
FIG. 9 is an appearance view illustrating an example of the structure of a camera, which is an imaging apparatus according to an embodiment of the invention.

FIG. 9 shows an example of a digital single lens reflex camera, which is an example of an imaging apparatus including the zoom lens. The digital single lens reflex camera includes a camera body 1 and an imaging lens 2 that is attached to the front side of the camera body 1. The camera body 1 includes, for example, an imaging device, such as a CCD, that outputs an electric signal (image signal) corresponding to an object image formed by the imaging lens 2, a signal processing circuit that processes the image signal output from the imaging device and generates an image, and a recording medium on which the generated image is recorded. In addition, a display unit 3 that displays a captured image is provided on the rear surface of the camera body 1. The zoom lens according to this embodiment is used as the imaging lens 2 of the digital single lens reflex camera.

The zoom lens according to this embodiment may be provided in other imaging apparatuses, such as a video camera. In addition, the zoom lens may also be provided in a film camera such as a silver salt single lens reflex camera.

In the zoom lens, when power varies from a wide angle end to a telephoto end through a middle portion, each lens group and the aperture diaphragm St are moved as represented by solid lines in FIGS. 1 and 2. That is, when power varies from the wide angle end to the telephoto end, the first lens group G1 and the second lens group G2 are moved to the image surface along the optical axis, and then moved to the object side. In addition, the third lens group G3 and the fourth lens group G4 are moved to only the object side along the optical axis. In the zoom lens, the surface spacing between the second lens group G2 and the third lens group G3 mainly varies to change power, and the surface spacing between the third lens group G3 and the fourth lens group G4 varies to correct a variation in the image surface due to a change in power.

In the zoom lens, focusing on a short-distance object point is performed by moving the second lens group G2 to the object side.

In the first structural example shown in FIG. 1, the first lens group G1 and the second lens group G2 are independently moved when power varies. That is, when power varies, the surface spacing D6 between the first lens group G1 and the second lens group G2 is changed. On the other hand, in the second structural example shown in FIG. 2, the first lens group G1 and the second lens group G2 are integrally moved when power varies. That is, when power varies, the surface spacing D6 between the first lens group G1 and the second lens group G2 is maintained at a constant value.

In both the first and second structural examples, the aperture diaphragm St is moved integrally with the third lens group G3.

In the zoom lens, it is preferable that the first lens group G1 include a plurality of negative lenses and one or more positive lenses. In addition, it is preferable that the first lens group G1 include at least one aspheric lens. It is preferable that the aspheric lens have an aspheric shape in which, when a paraxial refractive power is positive, the positive refractive power is increased toward the periphery of the lens. In addition, it is preferable that the aspheric lens have an aspheric shape in which, when the paraxial refractive power is negative, the negative refractive power is decreased toward the periphery of the lens. A positive lens having the highest refractive index in the first lens group G1 is preferably a biconvex lens. It is preferable that the first lens group G1 include at least one positive lens satisfying Conditional expressions 2 and 3 given below:

$N1 > 1.75$, and [Conditional expression 2]

$\nu1 > 28$ [Conditional expression 3]

(where N1 indicates the refractive index of the positive lens having the highest refractive index in the first lens group G1 with respect to the d-line, and $\nu1$ indicates the Abbe number of the positive lens having the highest refractive index in the first lens group G1 with respect to the d-line).

In the structural example shown in FIG. 1, the first lens group G1 includes two negative lenses L11 and L12 each having a concave surface facing the image side, and one biconvex lens L13. The biconvex lens L13 satisfies the above-mentioned Conditional expressions 1 and 2.

It is preferable that the second lens group G2 include one negative lens L21 having a concave surface facing the object side. The negative lens L21 of the second lens group G2 preferably has a shape in which an object-side surface has a concave surface that has a strong curvature and faces the object side (the absolute value of the radius of curvature of the object-side surface is smaller than that of the image-side surface).

In the zoom lens according to this embodiment of the invention, it is preferable that the third lens group G3 include a plurality of positive lenses and one or more negative lenses and the fourth lens group G4 include a plurality of positive lenses and one or more negative lenses. In addition, it is preferable that the third and fourth lens groups satisfy Conditional expression 1 given below:

$0.7 < \Delta Z3/\Delta Z4 < 1.1$ [Conditional expression 1]

(where $\Delta Z3$ indicates the movement amount of the third lens group G3 when power varies from the wide angle end to the telephoto end, and $\Delta Z4$ indicates the movement amount of the fourth lens group G4 when power varies from the wide angle end to the telephoto end).

It is preferable that the fourth lens group G4 include at least one positive lens satisfying Conditional expression 4 given below:

$\nu2 > 75$ [Conditional expression 4]

(where $\nu2$ indicates the Abbe number of a positive lens in the fourth lens group G4 with respect to the d-line).

In the structural example shown in FIG. 1, the third lens group G3 includes a cemented lens of a positive lens L31, a negative lens L32, and a positive lens L33 arranged in this order from the object side. The fourth lens group G4 includes a cemented lens of a positive lens L41, a negative lens L42, a positive lens L43, and a negative lens L44, and a positive lens L45 arranged in this order from the object side.

Next, the operation and effect of the zoom lens having the above-mentioned structure will be described.

The zoom lens includes four lens groups having negative, negative, positive, and positive refractive powers that are arranged in this order from the object side. In the four-group zoom structure, a movement method is optimized such that, when power varies from the wide angle end to the telephoto end, the first lens group G1 and the second lens group G2 are moved to the image surface along the optical axis and then moved to the object side, and the third lens group G3 and the fourth lens group G4 are moved to only the object side along the optical axis. In addition, the first lens group G1 includes at least one aspheric lens, thereby optimizing the aspheric shape of the lens. As such, the first lens group G1 includes an appropriate aspheric surface, and a movement method when power varies is optimized. In this way, it is possible to achieve an optical system having a small size, a zoom ratio of 2 or more at a wide angle, and a small variation in performance when power varies.

Focusing on a short-distance object point is performed by moving the second lens group G2 to the object side, and the second lens group G2 has one negative lens having a concave surface facing the object side. Therefore, it is possible to achieve an optical system having high focus performances, such as a light-weight focus group and a small variation in performance during focusing.

In the zoom lens, the gap between the third lens group G3 and the fourth lens group G4 is changed to correct a variation in the image surface due to a change in power. Conditional expression 1 relates to the movement amount of the third lens group G3 and the fourth lens group G4 when power varies. If the ratio is less than the lower limit of Conditional expression 1, the total length of the lens at the wide angle end is increased, which is not preferable. If the ratio is greater than the upper limit of Conditional expression 1, a variation in the image surface at the wide angle end and the telephoto end is not sufficiently corrected, which is not preferable.

In order to further reduce the size of the lens and effectively correct the variation in the image surface, it is preferable that the numerical range of Conditional expression 1 be the range of Conditional expression 1A given below:

$0.8 < \Delta Z3/\Delta Z4 < 0.9.$ [Conditional expression 1A]

Conditional expressions 2 and 3 relate to the appropriate conditions of the refractive index and the Abbe number of the positive lens in the first lens group G1. If the refractive index is less than the lower limit of Conditional expression 2, it is difficult to correct a field curvature, which is not preferable. If the Abbe number is less than the lower limit of Conditional expression 3, it is difficult to correct lateral chromatic aberration, which is not preferable.

In order to obtain a higher optical performance, it is preferable that the conditions of Conditional expressions 2 and 3 satisfy Conditional expressions 2A and 3A given below:

$N1 > 1.8$, and [Conditional expression 2A]

$v1 > 33.$ [Conditional expression 3A]

Conditional expression 4 relates to the appropriate conditions of the refractive index of the positive lens in the fourth lens group G4. If the refractive index is less than the lower limit of Conditional expression 4, it is difficult to correct lateral chromatic aberration, which is not preferable.

As described above, according to the zoom lens of this embodiment, the first lens group G1 includes an appropriate aspheric surface, and a moving method when power varies is optimized. Therefore, it is possible to achieve an optical system having a small size, a zoom ratio of 2 or more at a wide angle, and a small variation in performance when power varies. In addition, focusing on a short-distance object point is performed by moving the second lens group G2 including one negative lens L21 having a concave surface facing the object side to the object side. Therefore, it is possible to achieve an optical system having high focus performances, such as a light-weight focus group and a small variation in performance during focusing, in addition to a high zoom performance. In addition, an imaging apparatus including the zoom lens according to this embodiment can capture an image with a high zoom performance or a high focus performance.

EXAMPLES

Next, detailed numerical examples of the zoom lens according to this embodiment will be described. A plurality of numerical examples will be described below.

Table 1 and Tables 2A and 2B show detailed lens data corresponding to the structure of the zoom lens shown in FIG. 1.

TABLE 1

EXAMPLE 1 BASIC LENS DATA

| | | Si (SURFACE NUMBER) | Ri (CURVATURE RADIUS) | Di (SURFACE SPACING) | Ndj (REFRACTIVE INDEX) | vdj (ABBE NUMBER) |
|---|---|---|---|---|---|---|
| G1 | | 1 | 127.609 | 3.50 | 1.72916 | 54.7 |
| | | 2 | 31.787 | 15.45 | | |
| | | 3 | ∞ | 2.04 | 1.51760 | 63.5 |
| | | *4 | 35.019 | 7.68 | | |
| | | 5 | 67.431 | 9.90 | 1.88300 | 40.8 |
| | | 6 | −163.829 | D6(VARIABLE) | | |
| G2 | | 7 | −100.05 | 1.66 | 1.69680 | 55.5 |
| | | 8 | ∞ | D8(VARIABLE) | | |
| G3 | | 9 | 36.035 | 11.30 | 1.48749 | 70.2 |
| | | 10 | −41.022 | 1.39 | 1.83400 | 37.3 |
| | | 11 | 44.105 | 9.13 | 1.71736 | 29.5 |
| | | 12 | −149.464 | 1.98 | | |
| | | 13(APERTURE DIAPHRAGM) | | D13(VARIABLE) | | |
| G4 | | 14 | 53.604 | 3.95 | 1.48749 | 70.2 |
| | | 15 | −144.409 | 0.16 | | |
| | | 16 | 30.802 | 2.39 | 1.88300 | 40.8 |
| | | 17 | 20.34 | 1.12 | | |
| | | 18 | 20.444 | 16.42 | 1.49700 | 81.6 |
| | | 19 | −34.548 | 1.00 | 1.78800 | 47.4 |
| | | 20 | 34.548 | 1.88 | | |
| | | 21 | −311.842 | 2.00 | 1.90366 | 31.3 |
| | | 22 | −60.125 | | | |

(*ASPHERIC SURFACE)

TABLE 2A

EXAMPLE 1 ALL DATA

| | WIDE ANGLE END | MIDDLE | TELEPHOTO END |
|---|---|---|---|
| D6 | 10.38 | 14.49 | 10.13 |
| D8 | 51.04 | 12.12 | 1.60 |
| D13 | 9.19 | 3.72 | 2.63 |
| f | 36.25 | 65.26 | 87.01 |
| Bf | 60.20 | 91.71 | 113.70 |
| FNO. | 4.1 | 5.0 | 6.2 |
| 2ω | 82.6 | 50.4 | 38.8 |

TABLE 2B

EXAMPLE 1 ASPHERIG DATA

| ASPHERIG COEFFICIENT | FOURTH SURFACE |
|---|---|
| K | −2.0237667E−04 |
| A3 | −7.8941048E−06 |
| A4 | 3.4238341E−06 |
| A5 | −1.0680428E−06 |
| A6 | 7.9338412E−08 |
| A7 | −2.3939406E−09 |
| A8 | 2.4379184E−12 |
| A9 | −2.6013593E−13 |
| A10 | 2.8743648E−14 |
| A11 | 2.1053910E−15 |
| A12 | 6.5510324E−17 |
| A13 | −3.5588453E−21 |
| A14 | −6.8550615E−19 |
| A15 | 4.5405327E−21 |
| A16 | 9.8592767E−22 |
| A17 | 2.5138858E−23 |
| A18 | −3.2548866E−24 |
| A19 | 7.8715345E−26 |
| A20 | −6.0628925E−28 |

In particular, Table 1 shows basic lens data, and Tables 2A and 2B show the other data. In the lens data shown in Table 1, an i-th surface number (i=1 to 22) is written in the field of a surface number Si. In this case, the surface of a component closest to the object side in the zoom lens according to Example 1 is given number 1, and the surface number is sequentially increased toward the image side. The radius of curvature (mm) of the i-th surface from the object side is written in the field of a radius of curvature Ri so as to correspond to Ri shown in FIG. 1. The spacing (mm) between the i-th surface Si and an (i+1)-th surface Si+1 on the optical axis is written in the field of a surface spacing Di. The refractive index of a j-th optical component from the object side with respect to the d-line (wavelength: 587.6 nm) is written in the field of Ndj. The Abbe number of the j-th optical component from the object side with respect to the d-line is written in the field of νdj.

In the zoom lens according to Example 1, when power varies, each lens group is moved along the optical axis. In addition, the second lens group G2 is moved along the optical axis for focusing. Therefore, the surface spacing D6 between the first lens group and the second lens group, the surface spacing D8 between the second lens group and the third lens groups, and the surface spacing D13 between the third lens group and the fourth lens group vary. Table 2A shows the values of the surface spacings D6, D8, and D13 at the wide angle end, a middle portion, and the telephoto end as data when power varies. These values are obtained during infinity focusing.

Table 2A also shows the paraxial focal length f (mm), the back focal length Bf (mm), the angle of view (2ω), and the F number (FNO.) of the entire lens system at the wide angle end, the middle portion, and the telephoto end as the other data.

In the lens data shown in Table 1, symbol '*' added to the left side of the surface number indicates an aspheric lens surface. In the zoom lens according to Example 1, an image-side surface S4 of the negative lens L12 in the first lens group G1 has an aspheric shape. In the basic lens data shown in Table 1, the value of a radius of curvature near the optical axis is shown as the radius of curvature of the aspheric surface.

Table 2B shows aspheric data of the zoom lens according to Example 1. In the numerical values represented as the aspheric data, 'E' indicates the exponent of 10, and the number represented by an exponential function having 10 as a base is multiplied by a number before 'E'. For example, '1.0E-02' indicates '1.0×10$^{-2}$'.

The aspheric data of the zoom lens according to Example 1 includes coefficients $A_n$ and K of Aspheric expression A given below:

$$Z = C \cdot h^2 / \{1 + (1 - K \cdot C^2 \cdot h^2)^{1/2}\} + \Sigma A_n \cdot h^n \quad \text{[Aspheric expression A]}$$

(where n is an integer equal to or greater than 3, Z indicates the depth (mm) of an aspheric surface, h indicates the distance (height) (mm) from the optical axis to a lens surface, K indicates an eccentricity, C indicates a paraxial curvature=1/R (R is a paraxial radius of curvature), and $A_n$ indicates an n-order aspheric coefficient).

Specifically, Z indicates the length (mm) of a perpendicular line that drops from a point on the aspheric surface at a height h from the optical axis to a plane tangent to the top of the aspheric surface (a plane vertical to the optical axis).

In the zoom lens according to Example 1, each of the aspheric surfaces is represented by effectively using coefficients $A_3$ to $A_{20}$ as an aspheric coefficient $A_n$.

Table 3 and Tables 4A and 4B show detailed lens data corresponding to the structure of a zoom lens according to Example 2 shown in FIG. 2, similar to the zoom lens according to Example 1.

TABLE 3

EXAMPLE 2 BASIC LENS DATA

| | | Si (SURFACE NUMBER) | Ri (CURVATURE RADIUS) | Di (SURFACE SPACING) | Ndj (REFRACTIVE INDEX) | νdj (ABBE NUMBER) |
|---|---|---|---|---|---|---|
| G1 | { | 1 | 138.506 | 2.90 | 1.72916 | 54.7 |
| | | 2 | 34.59 | 16.11 | | |
| | | 3 | ∞ | 2.80 | 1.51760 | 63.5 |
| | | *4 | 35.232 | 8.80 | | |
| | | 5 | 70.531 | 10.80 | 1.88300 | 40.8 |
| | | 6 | −176.168 | D6(VARIABLE) | | |
| | | 7 | −105.501 | 1.90 | 1.69680 | 55.5 |

TABLE 3-continued

EXAMPLE 2 BASIC LENS DATA

| | Si (SURFACE NUMBER) | Ri (CURVATURE RADIUS) | Di (SURFACE SPACING) | Ndj (REFRACTIVE INDEX) | vdj (ABBE NUMBER) |
|---|---|---|---|---|---|
| G2 | 8 | ∞ | D8(VARIABLE) | | |
| G3 | 9 | 36.241 | 11.47 | 1.48749 | 70.2 |
| | 10 | −43.016 | 1.51 | 1.83400 | 37.3 |
| | 11 | 42.431 | 9.19 | 1.71736 | 29.5 |
| | 12 | −169.492 | 1.96 | | |
| | 13(APERTURE DIAPHRAGM) | | D13(VARIABLE) | | |
| G4 | 14 | 56.744 | 3.88 | 1.48749 | 70.2 |
| | 15 | −155.32 | 0.16 | | |
| | 16 | 31.449 | 2.49 | 1.88300 | 40.8 |
| | 17 | 20.639 | 1.10 | | |
| | 18 | 20.774 | 17.02 | 1.49700 | 81.6 |
| | 19 | −35.87 | 1.78 | 1.78800 | 47.4 |
| | 20 | 35.87 | 1.92 | | |
| | 21 | −423.023 | 2.19 | 1.90366 | 31.3 |
| | 22 | −63.75 | | | |

(*ASPHERIC SURFACE)

TABLE 4A

EXAMPLE 2 ALL DATA

| | WIDE ANGLE END | MIDDLE | TELEPHOTO END |
|---|---|---|---|
| D6 | 11.11 | 11.11 | 11.11 |
| D8 | 55.81 | 14.17 | 1.63 |
| D13 | 10.27 | 5.14 | 2.85 |
| f | 36.25 | 65.25 | 86.99 |
| Bf | 60.57 | 91.39 | 113.93 |
| FNO. | 4.08 | 5.00 | 5.80 |
| 2ω | 82.4 | 50.5 | 38.8 |

TABLE 4B

EXAMPLE 2 ASPHERIC DATA

| ASPHERIC COEFFICIENT | FOURTH SURFACE |
|---|---|
| K | −1.2171998E−04 |
| A3 | −8.4568644E−06 |
| A4 | 4.0407837E−06 |
| A5 | −1.0860657E−06 |
| A6 | 7.9652712E−08 |
| A7 | −2.3598157E−09 |
| A8 | 4.4926036E−12 |
| A9 | −2.7114102E−13 |
| A10 | 2.4328472E−14 |
| A11 | 1.7711939E−15 |
| A12 | 6.9787860E−17 |
| A13 | 1.7681123E−19 |
| A14 | −6.5651020E−19 |
| A15 | 5.7379172E−21 |
| A16 | 9.5280571E−22 |
| A17 | 2.0624758E−23 |
| A18 | −3.2901684E−24 |
| A19 | 8.8678210E−26 |
| A20 | −7.7366341E−28 |

In a zoom lens according to Example 2, each lens group is moved along the optical axis when power varies, similar to the zoom lens according to Example 1. In addition, the second lens group G2 is moved along the optical axis for focusing. Therefore, the surface spacing D6 between the first lens group and the second lens group, the surface spacing D8 between the second lens group and the third lens group, and the surface spacing D13 between the third lens group and the fourth lens group vary. Table 4A shows the values of the surface spacings D6, D8, and D13 at the wide angle end, a middle portion, and the telephoto end as data when power varies. These values are obtained during infinity focusing. In the zoom lens according to Example 2, the first lens group G1 and the second lens group G2 are integrally moved when power varies. Therefore, the surface spacing D6 between the first lens group G1 and the second lens group G2 is constant when power varies.

Table 4A also shows the paraxial focal length f (mm), the back focal length Bf (mm), the angle of view (2ω), and the F number (FNO.) of the entire lens system at the wide angle end, the middle portion, and the telephoto end as the other data.

Table 4B shows aspheric data of the zoom lens according to Example 2. The zoom lens according to Example 2 has the same aspheric surfaces as the zoom lens according to Example 1.

Table 5 shows values related to the above-mentioned Conditional expressions according to Examples 1 and 2.

TABLE 5

VALUES RELATED TO CONDITIONAL EXPRESSION

| CONDITIONAL EXPRESSION | EXPRESSION NUMBER | EXAMPLE 1 | EXAMPLE 2 |
|---|---|---|---|
| ΔZ3 | | 46.94 | 45.94 |
| ΔZ4 | | 53.50 | 53.36 |
| 0.7 < ΔZ3/ΔZ4 < 1.1 | (1) | 0.88 | 0.86 |
| N1 > 1.75 | (2) | 1.88300 | 1.88300 |
| v1 > 28 | (3) | 40.8 | 40.8 |
| v2 > 75 | (4) | 81.6 | 81.6 |

As can be seen from Table 5, the values of Examples 1 and 2 are within the numerical ranges of each Conditional expressions.

FIG. 3 is a diagram illustrating the aberrations of the zoom lens according to Example 1 at the wide angle end, in which (A) shows spherical aberration, (B) shows astigmatism, (C) shows distortion, and (D) shows lateral chromatic aberration. FIG. 4 is a diagram illustrating the aberrations of the zoom lens according to Example 1 in the middle portion, in which (A) shows spherical aberration, (B) shows astigmatism, (C) shows distortion, and (D) shows lateral chromatic aberration.

FIG. 5 is a diagram illustrating the aberrations of the zoom lens according to Example 1 at the telephoto end, in which (A) shows spherical aberration, (B) shows astigmatism, (C) shows distortion, and (D) shows lateral chromatic aberration. Each of the aberration diagrams shows aberrations when the d-line (587.6 nm) is used as a reference wavelength. The spherical aberration diagrams show aberrations with respect to the g-line (wavelength: 435.8 nm) and the C-line (wavelength: 656.3 nm). In the astigmatism diagrams, a solid line indicates aberration in a sagittal direction, and a dotted line indicates aberration in a tangential direction. In addition, FNO. indicates an F number, and ω indicates a half angle of view.

Similarly, all aberrations of the zoom lens according to Example 2 are shown in (A) to (D) of FIG. 6 (the wide angle end), (A) to (D) of FIG. 7 (the middle portion), and (A) to (D) of FIG. 8 (the telephoto end).

As can be seen from the numerical data and the aberration diagrams, in each example, an angle of view 2ω at the wide angle end is greater than 70°, and an F number of about F4 is obtained. In addition, it is possible to achieve a zoom lens that has a zoom ratio of about 2.4 and a small size, and can correct all aberrations in each power variation range.

Although the embodiments and examples of the invention have been described above, the invention is not limited thereto. Various modifications and changes of the invention can be made without departing from the scope and spirit of the invention. For example, the radius of curvature, the surface spacing, and the refractive index of each lens component are not limited to the values described in the above-mentioned numerical examples, but they may have other values.

What is claimed is:

1. A zoom lens comprising, in order from an object side:
a first lens group having a negative refractive power;
a second lens group having a negative refractive power;
a third lens group having a positive refractive power;
a stop; and
a fourth lens group having a positive refractive power;
when power varies from a wide angle end to a telephoto end, the first lens group and the second lens group are moved to an image surface along an optical axis and then moved to the object side,
the third lens group and the fourth lens group are moved to only the object side along the optical axis,
the first lens group includes at least one aspheric lens, and
the aspheric lens has an aspheric shape in which a positive refractive power is increased toward the periphery of the lens when a paraxial refractive power is positive and a negative refractive power is decreased toward the periphery of the lens when the paraxial refractive power is negative.

2. The zoom lens according to claim 1,
wherein focusing on a short-distance object point is performed by moving the second lens group to the object side.

3. The zoom lens according to claim 1,
wherein the second lens group includes one negative lens having a concave surface facing the object side, and
the negative lens has a shape in which the absolute value of the radius of curvature of an object-side surface is smaller than that of an image-side surface.

4. The zoom lens according to claim 1,
wherein the third lens group includes a plurality of positive lenses and one or more negative lenses,
the fourth lens group includes a plurality of positive lenses and one or more negative lenses, and
the third and fourth lens groups satisfy the following conditional expression:

$$0.7 < \Delta Z3/\Delta Z4 < 1.1$$

where $\Delta Z3$ indicates the movement amount of the third lens group when power varies from the wide angle end to the telephoto end, and $\Delta Z4$ indicates the movement amount of the fourth lens group when power varies from the wide angle end to the telephoto end.

5. The zoom lens according to claim 1,
wherein the first lens group includes at least one positive lens satisfying the following conditional expressions:

$$N1 > 1.75, \text{ and}$$

$$v1 > 28$$

where N1 indicates the refractive index of a positive lens having the highest refractive index in the first lens group with respect to the d-line, and v1 indicates the Abbe number of the positive lens having the highest refractive index in the first lens group with respect to the d-line.

6. The zoom lens according to claim 1,
wherein the fourth lens group includes at least one positive lens satisfying the following conditional expression:

$$v2 > 75$$

where v2 indicates the Abbe number of a positive lens in the fourth lens group with respect to the d-line.

7. The zoom lens according to claim 1,
wherein the first lens group includes a plurality of negative lenses and one positive lens.

8. The zoom lens according to claim 5,
wherein the positive lens having the highest refractive index in the first lens group is a biconvex lens.

9. The zoom lens according to claim 1,
wherein the first lens group and the second lens group are integrally moved when power varies.

10. An imaging apparatus comprising:
the zoom lens according to claim 1; and
an imaging device that outputs an image signal corresponding to an optical image formed by the zoom lens.

* * * * *